United States Patent

[11] 3,571,624

[72] Inventor Wing C. Leung
New York, N.Y.
[21] Appl. No. 668,557
[22] Filed Sept. 18, 1967
[45] Patented Mar. 23, 1971
[73] Assignee International Business Machines Corporations
Armonk, N.Y.

[54] POWER TRANSISTOR SWITCH WITH AUTOMATIC SELF-FORCED-OFF DRIVING MEANS
9 Claims, 2 Drawing Figs.

[52] U.S. Cl. ........ 307/254, 307/246, 307/300
[51] Int. Cl. ........ H03k 17/04, H03k 17/80

[50] Field of Search ........ 307/298, 300, 314, 319, 320, 280, 282, 246, 254, 239

[56] References Cited

UNITED STATES PATENTS

| | | | |
|---|---|---|---|
| 2,963,592 | 12/1960 | De Graaf | 307/300X |
| 3,081,437 | 3/1963 | Radcliffe, Jr. | 307/300X |
| 3,127,522 | 3/1964 | Thorndyke | 307/314X |
| 3,129,354 | 4/1964 | Hellstrom | 307/300X |
| 3,170,072 | 2/1965 | Hellstrom | 307/300 |
| 3,231,752 | 1/1966 | Jacob | 307/300 |

*Primary Examiner*—Stanley T. Krawczewicz
*Attorneys*—Hanifin and Jancin and Nathan Cass

ABSTRACT: A self-forced-off transformer driving circuit for a power transistor switch which automatically provides for fast turnoff of the power transistor switch and automatic maintenance of the off condition until the next on period.

INVENTOR
WING C. LEUNG

BY Nathan Cass
ATTORNEY

POWER TRANSISTOR SWITCH WITH AUTOMATIC SELF-FORCED-OFF DRIVING MEANS

This invention relates generally to power transistor switching systems, and more particularly to means and methods for controlling a power transistor switch.

In power supply systems and the like, proper control of the power transistor switches is an important part of successful system operation. The present invention provides a remarkably simple circuit for controlling a power transistor switch in a manner which achieves several important advantages. Briefly, the present invention comprises a transformer driving circuit including a multiwinding transformer, controlling transistors and a timing network which provides for the storage of sufficient energy during the on time of the power transistor switch to automatically provide an initial high magnitude reverse base drive current sufficient to rapidly turn off the power transistor switch when the turn-on input signal is removed, and to automatically maintain the power transistor switch in a reversed bias condition until the next turn-on input signal.

The foregoing and other objects, features and advantages of the invention will be apparent from the following more particular description of a preferred embodiment of the invention as illustrated in the accompanying drawings.

Figure 1:
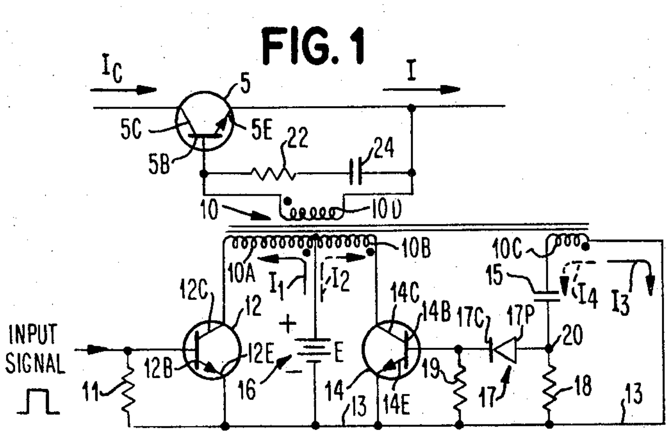
FIG. 1 is a schematic diagram of an embodiment of a self-forced-off driving system for a power transistor switch in accordance with the invention.

With reference to the circuit of FIG. 1, the power transistor switch to be controlled is designated by the numeral 5. As is also the case for the other transistors 12 and 14 in FIG. 1, either a PNP or NPN transistor can be used by providing appropriate modification in the circuitry. Power transistor switch 5 includes a collector 5C and an emitter 5E through which current $I_C$ flows when power transistor switch 5 is turned on by an appropriate positive switching bias being applied to its base 5B. In FIG. 1 this occurs in response to the application of a positive turn-on input signal to the base 12B of an NPN transistor 12 coupled to the base 5B of power transistor switch 5 via a transformer 10. More specifically, power transistor switch 5 has its base 5B connected to the dotted end of winding 10D of transformer 10 and its emitter 5B connected to the undotted end. Transistor 12 has its collector 12C connected to the undotted end of winding 10A of transformer 10 and its emitter 12E connected to the dotted end of winding 10A, via return or ground line 13 and a DC voltage supply 16 of magnitude E having the polarity indicated. A resistor 11 connected across the base 12B and emitter 12E of transistor 12 serves as an input resistor Accordingly, when the turn-on input signal is applied to transistor base 12B, transistor 12 is turned on, causing a current indicated by the arrow $I_1$ in FIG. 1 to flow from DC supply 16 into the dotted end of winding 10A so as to thereby induce a voltage in winding 10D which will positively bias the base 5B of power transistor 5, turning it on for the duration of the input signal. The "dot" provided at one end of each transformer winding is used in the conventional manner to indicate the relative polarities of the transformer windings.

Figure 2:
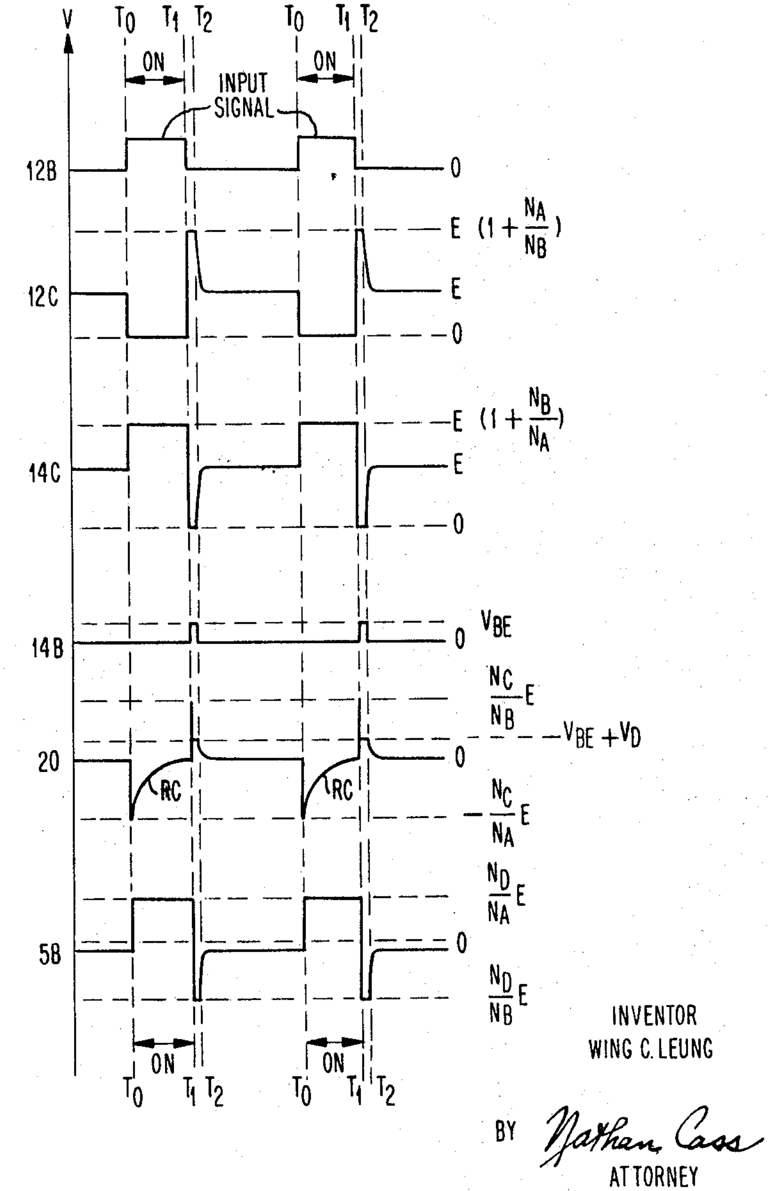
FIG. 2 is a series of graphs illustrating voltage vs. time waveforms at various points in the circuit of FIG. 1 during operation thereof.

Now referring to the graphs of FIG. 2 along with the circuit diagram of FIG. 1, it should initially be noted that each of the graphs in FIG. 2 is designated at the left by the numeral of the respective point in FIG. 1 to which it corresponds. For example, graph 12B in FIG. 2 illustrates the voltage waveform (with respect to the return or ground line 13) appearing at the base 12B of transistor 12, while the bottom graph 5B illustrates the voltage waveform (with respect to emitter 5E) appearing on the base 5B of power transistor 5. The idealized voltage magnitudes of the waveforms in FIG. 2 are indicated, where appropriate, on the right. The characters $N_A$, $N_B$, $N_C$ and $N_D$ respectively designate the number of turns of windings 10A, 10B, 10C and 10D.

It will be understood from FIGS. 1 and 2 that the on period indicated as occurring between times $T_0$ and $T_1$ in FIG. 2 corresponds to the period during which the turn-on input signal is applied to base 12B of transistor 12, causing a current $I_1$ to flow in winding 10A. The resulting voltage induced in winding 10D produces a positive bias on base 5B to turn on power transistor switch 5. As is to be expected, the peak voltage appearing at the power transistor base 5B is the voltage E multiplied by the turns ratio $N_D/N_A$ of windings 10D and 10A.

So far, it has merely been noted how the power transistor switch 5 is turned on in response to the application of the turn-on input signal. The important requirement still remains of turning off the power transistor 5 until the appearance of the next input signal. Obviously, there are a variety of ways in which the turnoff can be accomplished. However, known techniques for this purpose are undesirable in that they are unduly complex, too slow, too critical, unreliable and/or introduce harmful transients. In accordance with the present invention a particularly advantageous technique is provided for turning off the power transistor switch 5 which achieves fast turnoff with minimum transients and without requiring a special turnoff input signal, as well as providing compensation for collector current variations in the power transistor switch. The manner in which these are accomplished by the present invention will become evident from the following description of the remaining portions of the circuit of FIG. 1 which provide the turnoff function.

The turnoff circuitry of FIG. 1 comprises two additional windings 10B and 10C provided on transformer 10, an NPN transistor 14, a diode 17, a capacitor 15 and resistors 18 and 19. Resistor 22 and capacitor 24 connected across the transformer secondary winding 10D serve to help minimize transients as will become evident hereinafter. Transformer winding 10B has one end connected to the collector 14C of transistor 14 and the other end connected to the emitter 14E, via the DC voltage supply 16 and return line 13. The base 14B of transisitor 14 is connected via diode 17 to the junction 20 of capacitor 15 and resistor 18. Diode 17 is poled so that its cathode 17C is connected to base 14B and its plate 17P is connected to junction 20. The other end of capacitor 15 is connected to the undotted end of primary winding 10C, and the other ends of resistor and primary winding 10C are connected to return line 13. Resistor 19 connected between transistor base 14B and return line 13 serves as an input resistor for transistor 14.

The operation of the above described turnoff circuitry will now be described using the graphs of FIG. 2. It will be understood that, when the input signal is applied on transistor base 12B at time $T_0$, not only does the flow of current $I_1$ in winding 10A induce a voltage in winding 10D to turn on the power transistor switch 5, as previously described, but also a voltage is induced in winding 10C which causes a current $I_3$ to flow out of the dotted end thereof to charge up capacitor 15 through resistor 18. This is illustrated by graph 20 which shows the voltage waveform at the junction 20 between capacitor 15 and resistor 18. It will be understood from graph 20 that, at time $T_0$, the entire voltage induced in winding 10C (less any residual voltage on capacitor 15 which is usually negligible) appears across resistor 18, causing the voltage at junction 20 to immediately fall to the induced voltage in winding 10C, which is $(-N_C/N_A)$ E. Then, during the period $T_0$ to $T_1$, capacitor 15 charges with a time constant determined by the RC product of resistor 18 and capacitor 15, causing the voltage at junction 20 to exponentially rise toward zero, as illustrated by curve RC in graph 20. Since diode 17 is, thus, back-biased throughout the input signal or on period $T_0$ to $T_1$, transistor 14 receives no positive bias on its base 14B and remains cut off. Although diode 17 could be eliminated, it is desirable in that it prevents the high negative voltage appearing at junction 20 at time $T_0$ from being directly applied to the transistor base 14B, thereby permitting the choice of a transistor 14 with a low reverse breakdown voltage.

It will be noted in graph 14C of FIG. 2 that a positive voltage appears on collector 14C of transistor 14 during the input signal period $T_0$ to $T_1$. This occurs as a result of current $I_1$ flowing in transformer winding 10A also inducing a voltage in transformer winding 10B during the input signal or on period $T_0$ to $T_1$, as well as in windings 10C and 10D, as previously described. However, because transistor 14 is cut off during the input signal period $T_0$ to $T_1$, no current flows to collector 14C.

When the input signal is removed at time $T_1$, the voltage induced in windings 10A, 10B, 10C and 10D will reverse in polarity in conformance with well-known transformer operating principles. As shown in graph 20, the voltage at junction 20 thus becomes positive at time $T_1$, forward-biasing diode 17 and thereby causing a positive bias to appear on base 14B, as illustrated in graph 14B, resulting in the turning on of transistor 14. The voltage at junction 20 at time $T_1$ ends up at a value equal to the sum of the saturated base to emitter voltage $V_{BE}$ of transistor 14 and the voltage drop $V_D$ across diode 17. The removal of the input signal at $T_1$ thus results in turning on transistor 14, while transistor 12 is turned off. Current $I_1$ flowing in winding 10A from DC power supply 16 thus falls to zero, while current $I_2$ now flows from power supply 16 to winding 10B. For ease of recognition, currents $I_1$ and $I_3$ flowing during the on or signal input period $T_0$ and $T_1$ are indicated by solid line arrows in FIG. 1, while currents $I_2$ and $I_4$ flowing during the off period $T_1$ to $T_0$ are indicated by dashed line arrows. It will be understood from graph 5B that the provision of current flow $I_2$ in winding 10B at time $T_1$ is particularly advantageous in that it causes an initial high magnitude reverse-bias voltage to be induced in winding 10D which is significantly greater than would otherwise occur, thereby producing very rapid turnoff of the power transistor switch 5.

The flow of current $I_2$ occurring at time $T_1$ continues until time $T_2$ when the current $I_4$ which begins to flow from the undotted end of winding 10C at time $T_1$ charges capacitor 15 to a value which drops the voltage at junction 20 below that required to maintain transistor 14 on. Capacitor 15 and the transformer turns ratio are chosen to provide a sufficiently large initial high magnitude reverse bias on base 5B for a sufficiently long period $T_1$ to $T_2$ so as to clear the stored charges in the base region and completely turn off the power transistor switch 5. When transistor 14 turns off at time $T_2$, both transistors 12 and 14 will be off, and the circuit will return to its initial condition to await the next input signal, as illustrated in the graphs of FIG. 2.

Besides providing the advantageous feature of an initial high magnitude reverse bias on base 5B for rapid turnoff of the power transistor switch 5, the current of FIG. 1 provides the additional advantageous feature of automatically maintaining a reverse bias voltage at the base-emitter junction of the transistor switch 5 following time $T_2$ to keep the switch 5 reliably cut off until the next input signal, as illustrated in graph 5B by the small negative voltage appearing at base 5B during the period $T_2$ to $T_0$. This is accomplished by designing the transformer windings so that the integral of the voltage-time product with respect to the voltage on base 5B during the on signal input period $T_0$ to $T_1$ is significantly greater than that during the turnoff period $T_1$ to $T_2$. Since the two must necessarily be equal in accordance with well-known principles, sufficient stored energy will remain at time $T_2$ to maintain a small reverse-bias voltage at the power transistor base 5B until the occurrence of the next input signal at time $T_0$. The network comprised of resistor 22 and capacitor 24 in series across winding 10D serves essentially as an integrator for magnetization current remaining in the transformer 10 when both transistors are off at time $T_2$ in order to suppress any possible backswing to a minimum. Resistor 22 and capacitor 24 also serve as a noise filter at the base 5B of the power transformer 5.

The following exemplary values are now presented for the circuit of FIG. 1, it being understood that they are provided merely for illustrative purposes and should not be considered as limiting the present invention in any way, since considerable modifications and variations in values as well as construction and arrangement are possible without departing from the scope of the invention.

| | | |
|---|---|---|
| winding **10A** | — | 60 turns |
| winding **10B** | — | 45 turns |
| winding **10C** | — | 16 turns |
| winding **10D** | — | 11 turns |
| resistors **11** and **19** | — | 5,100 ohms |
| resistor **18** | — | 520 ohms |
| resistor **22** | — | 3.6 ohms |
| capacitor **15** | — | 0.003 microfarad |
| capacitor **24** | — | 6.8 microfarads |
| DC power supply E | — | 18 volts |
| switch current $I_C$ | — | 4 amperes |
| signal input frequency | — | 80 kilohertz |
| turnoff period $T_1$—$T_2$ | — | 0.5 microsecond |

While the invention has been particularly shown and described with reference to a preferred embodiment thereof, it will be understood by those skilled in the art that various changes in form and details may be made therein without departing from the spirit and scope of the invention.

I claim:

1. In combination:

A power transistor switch having a control element for controlling the on or off state of said switch and a driving circuit cooperating therewith;

Said driving circuit including a transformer having first and second windings;

Said second winding being coupled to said control element;

first means for applying a periodically occurring turn-on signal to said control element via said first and second windings so as to turn on said switch for a predetermined on time period;

second means coupled to said second winding and including powered means automatically operative in response to the removal of said turn-on signal for causing a sufficiently high magnitude turnoff signal to be applied to said control element for a predetermined turnoff period to turn off said switch in a very much smaller time period than said on time period;

said driving circuit being constructed and arranged so that the integral of the voltage-time product with respect to the signal applied to said control element during said on time period is sufficiently greater than during said turnoff time period so that a turnoff bias is automatically maintained on said control element following said turnoff time period until the occurrence of the next turn-on signal;

wherein said second means includes a third winding of said transformer to which a signal is applied for said turnoff period for producing said sufficiently high magnitude turnoff signal; and wherein said second means includes a fourth winding of said transformer and means cooperating therewith for producing the signal applied to said third winding for said turnoff time in response to the removal of said turn-on signal.

2. In combination:

power transistor switch having a control element for controlling the on or off state of said switch and a driving circuit cooperating therewith;

said driving circuit including a transformer having first and second windings;

said second winding being coupled to said control element;

first means for applying a periodically occurring turn-on signal to said control element via said first and second windings so as to turn on said switch for a predetermined on time period;

second means coupled to said second winding and including powered means automatically operative in response to the removal of said turn-on signal for causing a sufficiently high magnitude turnoff signal to be applied to said control element for a predetermined turnoff period to turn off said switch in a very much smaller time period than said on time period;

said driving circuit being constructed and arranged so that the integral of the voltage-time product with respect to the signal applied to said control element during said on time period is sufficiently greater than during said turnoff time period so that a turnoff bias is automatically maintained on said control element following said turnoff time period until the occurrence of the next turn-on signal; and wherein said second means includes third and fourth windings of said transformer, a control transistor, means for causing said control transistor to be conductive for said turnoff period in response to a signal produced on said fourth winding, and means cooperating with said control transistor for causing a signal to be applied to said third winding for said turnoff period to produce said sufficiently high turnoff signal.

3. The invention in accordance with claim 2, wherein said means for causing said control transistor to be conductive for said turnoff period includes a timing network.

4. The invention in accordance with claim 3, wherein said first means includes an input transistor which is caused to be conductive during said on time period for coupling said turn-on signal to said first winding.

5. In combination:

a power transistor switch having two output elements between which the current to be switched flows and a control element for controlling the on or off state of said switch;

a transformer having first, second, third and fourth windings;

an input transistor;

a DC power supply;

means coupling said second winding to the control element and one output element of said switch and said first winding to said input transistor and said DC power supply so as to cause a periodically occurring turn-on signal to be applied to the control element of said switch via said input transistor and said first and second windings for turning on said switch for a predetermined on time period;

a control transistor;

a timing network;

means coupling said fourth winding to said control transistor and said timing network for causing said control transistor to be nonconductive during said one time period and to become conductive in response to the termination of said on time period for a predetermined turnoff time period as determined by said timing network;

and means coupling said control transistor to said DC power supply and said third winding so that the conductive state of said control transistor causes a signal to be applied to said third winding which induces a sufficiently high magnitude turnoff signal in said second winding to turn off said switch in a very much smaller time period than said on time period; and said transformer being constructed and arranged in conjunction with said timing network so that the integral of the voltage-time product with respect to the voltage appearing on the control element of said switch during said on time period is sufficiently greater than during said turnoff time period so that a turnoff bias is automatically maintained on the control element of said switch following said turnoff time period until the occurrence of the next turn-on signal.

6. In combination:

a power switch having a control element;

a control circuit for said switch comprising a transformer having first secondary winding means connected to said control element;

a turn-on control current source and first primary winding means coupled thereto for magnetizing said transformer to turn on said power switch;

a high amplitude turnoff control current source and second primary winding means coupled thereto to demagnetize said transformer for turning off said power switch;

auxiliary secondary winding means on said transformer;

and a control circuit for said turnoff source comprising said auxiliary secondary winding means and including energy storage means;

said storage means being arranged to store energy by operation of said auxiliary secondary winding means during conduction of said turn-on source and being arranged to furnish energy to activate said turnoff source by and upon collapse of turn-on current in said first primary means;

said storage means being proportioned to halt conduction of said turnoff source upon expiration of a predetermined turnoff time period; and means for automatically maintaining a relatively low amplitude turnoff bias on power switch control element after expiration of said period solely by the power of energy stored in the magnetization of said transformer.

7. In combination:

a power switch having a control element;

a control circuit for said switch comprising a transformer having a first secondary connected to said control element;

A turn-on control switch and a first primary coupled thereto for magnetizing said transformer to turn on said power switch;

a turnoff control switch and a second primary coupled thereto to partially demagnetize said transformer for turning off said power switch;

an auxiliary secondary on said transformer;

and a control circuit for said turnoff switch comprising said auxiliary secondary and including a capacitor;

said capacitor being connected to said auxiliary to be charged during conduction of said turn-on switch and to furnish energy to active conduction of said turnoff switch upon collapse of current through said first primary; and said capacitor being proportioned to halt conduction of said turnoff switch before said transformer is completely demagnetized, whereby said first secondary is operative to maintain a turnoff bias on said power switch control element after conduction through said turnoff switch is halted.

8. The invention in accordance with claim 7, wherein capacitor is discharged through a circuit including a control input circuit of said turnoff switch.

9. The invention in accordance with claim 8, wherein:

said switches are transistors;

the charging circuit for said capacitor has a first time constant;

the discharging circuit for said capacitor has a second time constant, shorter than said first time constant; and the conduction time of said turnoff switch as determined by said second time constant is shorter than would be required to completely demagnetize said transformer.